United States Patent [19]

Urban et al.

[11] Patent Number: 5,662,739
[45] Date of Patent: Sep. 2, 1997

[54] USE OF FATTY ACID TAURIDES FOR THE DISPERSION OF POLYCYCLIC PIGMENTS

[75] Inventors: Manfred Urban, Wiesbaden, Germany; Erwin Dietz, Wilmington, Del.

[73] Assignee: Hoechst Aktiengesellschaft, Frankfurt, Germany

[21] Appl. No.: 368,898

[22] Filed: Jan. 5, 1995

[30] Foreign Application Priority Data

Jan. 7, 1994 [DE] Germany .............. 44 00 329.3

[51] Int. Cl.⁶ ........................................... C09B 48/00
[52] U.S. Cl. ............... 106/497; 106/493; 106/494; 106/495; 106/498; 106/31.75; 106/31.77
[58] Field of Search ............... 106/493, 494, 106/495, 497, 498, 23 R

[56] References Cited

U.S. PATENT DOCUMENTS

| | | | |
|---|---|---|---|
| 3,256,285 | 6/1966 | Fuchs et al. | 106/497 |
| 3,865,605 | 2/1975 | Spietschka et al. | 106/287.21 |
| 4,253,839 | 3/1981 | Spietschka et al. | 8/565 |
| 4,310,359 | 1/1982 | Ehashi et al. | 106/494 |
| 4,317,682 | 3/1982 | Katsura et al. | 106/402 |
| 4,496,731 | 1/1985 | Spietschka et al. | 546/37 |
| 4,758,665 | 7/1988 | Spietschka et al. | 106/497 |
| 4,986,852 | 1/1991 | Dietz et al. | 106/498 |
| 5,062,577 | 11/1991 | Schmitt et al. | 241/171 |
| 5,318,627 | 6/1994 | Dietz et al. | 106/498 |

FOREIGN PATENT DOCUMENTS

| | | |
|---|---|---|
| 0088392 | 12/1984 | European Pat. Off. . |
| 0321919 | 6/1989 | European Pat. Off. . |
| 0 524 904 | 1/1993 | European Pat. Off. . |
| 1150046 | 12/1963 | Germany . |
| 1184881 | 9/1965 | Germany . |
| 1261106 | 8/1968 | Germany . |
| 2152485 | 5/1973 | Germany . |
| 2742575 | 5/1982 | Germany . |
| 3716587 | 2/1983 | Germany . |
| 0 882 986 | 11/1961 | United Kingdom . |
| 0 900 757 | 7/1962 | United Kingdom . |
| 0951451 | 3/1964 | United Kingdom . |
| 1002641 | 8/1965 | United Kingdom . |

OTHER PUBLICATIONS

Derwent Abstract AN 68–0001Q/00 of DE 126 1106–B Aug. 1968.
Derwent Abstract AN 73–27195u/20 of DE 2,152,485–A May 1973.
Derwent Abstract AN 79–12096B/07 of DE 2,742,575–B Feb. 1979.
Derwent Abstract AN 88–113619/17 of DE 3,716,587–C Apr. 1988.

*Primary Examiner*—Mark L. Bell
*Assistant Examiner*—Scott L. Hertzog
*Attorney, Agent, or Firm*—Connolly & Hutz

[57] ABSTRACT

Readily dispersible polycyclic pigments from the class of the quinacridones and dioxazines are prepared by using a fatty acid tauride of the formula (I)

$$R^1-CO-NR^2-(CH_2)_n-SO_3^- M^+ \qquad (I)$$

in which $R^1$ is a straight-chain or branched alkyl group having from 10 to 24 carbon atoms and $R^2$ is a hydrogen atom or a $C_1$–$C_6$-alkyl group, $M^+$ is a hydrogen ion, ammonium ion, alkali metal ion or alkaline earth metal ion and n is 1 or 2, or a mixture of at least two fatty acid taurides of the formula (I).

13 Claims, No Drawings

USE OF FATTY ACID TAURIDES FOR THE DISPERSION OF POLYCYCLIC PIGMENTS

DESCRIPTION

The present invention relates to the production of readily dispersible polycyclic pigments of high color strength from the class of the quinacridones and dioxazines.

Pigments for incorporation into high molecular weight materials are subject to stringent requirements. In order to achieve high color strength the finely divided pigments must be readily dispersible and must be able easily to be incorporated into the application medium. This requirement becomes harder to fulfill the more finely divided a pigment and the greater the number of applications in which it is employed. Hence in some application media, dispersion may remain incomplete, and the optimum color strength is not attained.

It is known that pigments can be treated with surface-active agents in order to improve their application properties. U.S. Pat. No. 3,865,605 teaches the achievement of this aim by treatment of the pigments with an alkaline solution of an alkylarylsulfonate or alkylphenol polyglycol ether-sulfate followed by acidification and isolation. The resulting pigments are suitable only for the pigmentation of coating materials and paints, which represents a considerable restriction on their use. Moreover, in some areas of application the use of surface-active agents based on phenolic compounds is no longer acceptable, on ecological grounds.

A series of surface-active substances—including fatty acid taurides—has been proposed as an additive to improve the applications properties of perylene pigments. The use of the perylene pigments obtained, however, is limited to the paints sector.

U.S. Pat. No. 4,496,731 describes the preparation of perylene-tetracarboxylic acid N,N'-dimethylimide pigments. The surface-active agents preferably employed in the production of these pigments are resin soaps and quaternary ammonium salts.

In this case transparent pigments are obtained which are preferably employed in metallic coating materials. The use of fatty acid taurides leads to opacifying pigments which are unsuitable, however, for the required application.

Up until now the addition of specific surface-active agents has led to pigments which are suitable only for specific applications. In the case of quinacridone and dioxazine pigments, the use of a single surface-active agent for a variety of applications had not hitherto been successful. A need existed to produce readily dispersible, toxicologically acceptable pigment preparations of the abovementioned type which are readily dispersible, flocculation-stable and compatible in a variety of applications.

It has been found that the stated object can surprisingly be achieved by the use of one or more fatty acid taurides.

The present invention relates to the use of a fatty acid tauride of the formula (I)

$$R^1—CO—NR^2—(CH_2)_n—SO_3^- M^+ \qquad (I)$$

in which $R^1$ is a straight-chain or branched alkyl group having 10 to 24, preferably 11 to 13, carbon atoms, $R^2$ is a hydrogen atom or a $C_1$–$C_6$-alkyl group, $M^+$ is a hydrogen ion, ammonium ion, alkali metal ion or alkaline earth metal ion, preferably $Na^+$, $K^+$ or $Ca^{++}$, and n is 1 or 2, or a mixture of at least two fatty acid taurides of the formula (I), for the production of readily dispersible polycyclic pigments from the class of the quinacridones and dioxazines.

Fatty acid taurides which are of particular interest for use according to the invention are those whose fatty acid residue $R^1$ has from 11 to 13 carbon atoms, and a mixture of such fatty acid taurides.

Examples of pigments from the class of dioxazines which, in accordance with the invention, are readily dispersible are C.I. Pigment Violet 23 (C.I. No. 51 319) of the formula

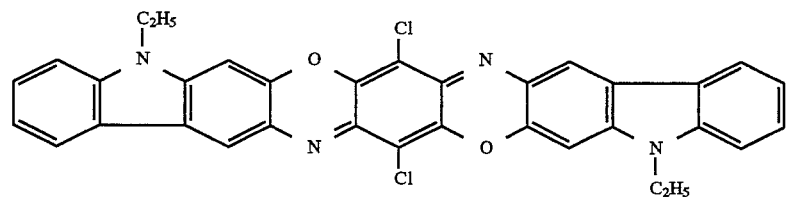

and C.I. Pigment Violet 37 (C.I. No. 51 345) of the formula

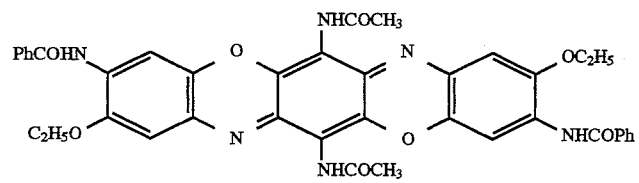

Examples of pigments from the class of quinacridones which, in accordance with the invention, are readily dispersible are C.I. Pigment Violet 19 (C.I. No. 46 500) of the formula

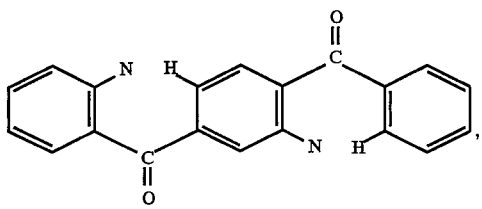

which may be in the β phase or γ phase, and also 2,9-dimethylquinacridone, 1,8-dichloroquinacridone, 2,9-dichloroquinacridone, 3,10-dichloroquinacridone and 2,9-di-N-methylcarboxamidoquinacridone.

The application of the fatty acid taurides can be made at various stages in the process of pigment production.

In the case of dioxazine pigments the pigment production process must ensure the conversion to pigment form of the crude pigments which are obtained as coarse crystals during synthesis in organic aromatic solvents, according to BIOS Final Report 960, page 75. This is achieved by a process of fine division (prepigments) and a subsequent finishing operation. Processes of fine division are, for example, wet and dry grinding operations, dissolution or suspension in concentrated acids followed by discharge into water, vatting and reoxidation.

In the production of quinacridone pigments the fine division can be achieved directly during the synthesis, according to GB-A-951 451. The finely divided prepigments which are present after the fine division are still not suitable for direct use but must be subjected in addition to a finishing treatment. Examples of such treatment are after treatment with water, solvents, acids or alkalis, with or without the addition of surface-active agents, with or without the addition of pigment dispersing agents, and/or temperature treatment.

The invention also relates to a process for the production of the abovementioned pigments, which comprises adding fatty acid taurides, before, during or after the finishing operation. It is also possible to add the fatty acid taurides during the fine division or to the isolated, moist pigment. The fatty acid taurides are preferably added directly prior to the finishing operation, in other words to the prepigments.

A particularly preferred procedure is one which comprises the initial introduction, based on the prepigment, of from one to three times the quantity of solvent, which is then acidified by addition of acid. Suitable solvents are those listed below which are used for the finishing operation. The salt of a fatty acid tauride is introduced into this mixture and is dissolved. Subsequently a prepigment as obtained, for example, in accordance with the information in U.S. Pat. No. 4,253,839. is introduced and stirred in. Following addition of from 5 to 10 times the quantity of water, the mixture is stirred at temperatures from 50° to 150° C. for from 1 to 5 hours. The solvent is subsequently distilled off and the pigment is isolated in the conventional manner.

Another possible procedure comprises adding an aqueous or aqueous-alkaline solution of a fatty acid tauride to the aqueous pigment suspensions which are present after the finishing operation and after the removal of the solvent, and after treating the mixture at temperatures of from 50° to 100° C. for from 1 to 5 hours. The pigment suspension is subsequently acidified and the pigment is isolated in a conventional manner.

Examples of suitable solvents for a finishing operation of this kind are: alicyclic hydrocarbons such as cyclohexane; $C_1$–$C_8$-alkanols and alicyclic alcohols such as methanol, ethanol, n- or isopropanol, n- or isobutanol, tert.-butanol, pentanols, hexanols, cyclohexanols; $C_1$–$C_5$-dialkyl or cyclic ketones such as acetone, diethyl ketone, methyl isobutyl ketone, methyl ethyl ketone or cyclohexanone; ethers and glycol ethers, for example the monomethyl or monoethyl ether of ethylene or propylene glycol, or butylglycol, ethyldiglycol or methoxybutanol; aromatic hydrocarbons such as toluene, xylenes or ethylbenzene, cyclic ethers such as tetrahydrofuran, aromatic chlorinated hydrocarbons such as chlorobenzene, o-dichlorobenzene or 1,2,4-trichlorobenzene, or bromobenzene; substituted aromatic compounds such as benzoic acid, nitrobenzene or phenol; aliphatic carboxamides such as formamide or dimethylformamide; cyclic carboxamides such as N-methylpyrrolidone; $C_1$–$C_4$-alkyl carboxylates such as butyl formate, ethyl acetate or propyl propionate; carboxylic acid $C_1$–$C_4$ glycol esters, $C_1$–$C_4$-alkyl phthalates and $C_1$–$C_4$-alkyl benzoates such as ethyl benzoate; heterocyclic bases such as pyridine, morpholine or picoline; and dimethyl sulfoxide and sulfolane.

Preferred organic solvents are alkanols, especially ethanol, propanols, butanols and pentanols; aliphatic carboxamides such as formamide or dimethylformamide; cyclic carboxamides, especially N-methylpyrrolidone; and $C_1$–$C_5$-dialkyl or cyclic ketones, especially acetone, diethyl ketone, methyl isobutyl ketone, methyl ethyl ketone or cyclohexanone.

It is possible furthermore to add the fatty acid taurides in solid form or as aqueous or aqueous-alkaline solutions to the finished pigment.

The fatty acid taurides are added in a quantity from 0.1 to 10% by weight, preferably from 0.5 to 5.0% by weight based on dry pigment.

In addition to the fatty acid taurides, other pigment dispersing agents can also be added. Appropriate pigment dispersing agents which can be employed in combination with the fatty acid taurides are those of the formula (II)

$$P\text{-}[X]_m \qquad \text{(II)}$$

in which

P is an m-valent radical of a pigment based on a quinacridone or dioxazine, preferably C.I. Pigment Violet 19 or C.I. Pigment Violet 23, in which m is from 1 to 4 and X is a group of the formula (III)

in which A is a five- or six-membered aromatic heterocycle which may be fused and which contains from 1 to 3 identical or different heteroatoms from the series consisting of nitrogen, oxygen and sulfur, and is preferably imidazolyl or indolyl and the heterocycle is attached to the methylene group via a carbon atom, $R^3$ and $R^4$ are a hydrogen atom, a $C_1$–$C_4$-alkyl, $C_2$–$C_4$-alkenyl or aryl group, preferably a phenyl group, and $R^3$ and $R^4$ may also together form an aliphatic or aromatic ring, and $R^5$ is a hydrogen atom or a $C_1$–$C_4$-alkyl, $C_1$–$C_3$-hydroxyalkyl or $C_2$–$C_4$-alkenyl group, or in which X is a group of the formula (IV)

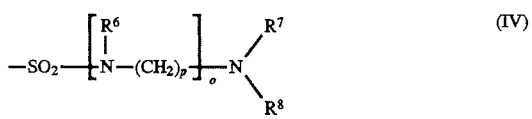

in which $R^7$ and $R^8$ independently of one another are each a hydrogen atom or a $C_1$–$C_{20}$-alkyl, $C_2$–$C_{20}$-alkenyl or $C_5$–$C_7$-cycloalkyl group, or in which $R^7$ and $R^8$ together with the adjacent nitrogen atom are an aliphatic or aromatic five- or six-membered heterocyclic system containing as ring members in each case from 1 to 3 identical or different heteroatoms from the series consisting of nitrogen, oxygen and sulfur, the system preferably being morpholinyl or pyrrolidinyl, and $R^6$ is a hydrogen atom or a $C_1$–$C_4$-alkyl group, p is 1 to 6 and o is 1 or 2.

The abovementioned pigment dispersing agents are advantageously added in a quantity of from 0 to 10% by weight, preferably from 0.5 to 5% by weight based on the basic pigment. The addition of the pigment dispersing agents can be made during the fine division, before, during or after the finishing operation, or to the isolated, moist pigment.

The abovementioned pigment dispersing agents are described in, for example, U.S. Pat. No. 4,317,682, U.S. Pat. No. 4,310,359 and U.S. Pat. No. 4,986,852.

The present invention relates furthermore to a pigment preparation which essentially comprises
 a) a pigment from the class of the quinacridones or dioxazines
 b) one or more fatty acid taurides of the formula (I), and
 c) if desired a pigment dispersing agent of the formula (II).

Preference is given to a pigment preparation which essentially comprises
 a) from 99.9 to 90% by weight, preferably from 99.5 to 90% by weight, of a pigment from the class of the quinacridones or dioxazines,
 b) from 0.1 to 10% by weight, preferably from 0.5 to 5% by weight, of one or more fatty acid taurides of the formula (I), and
 c) from 0 to 9.9% by weight, preferably from 0.5 to 5% by weight, of a pigment dispersing agent of the formula (II).

Particular preference is given to pigment preparations as mentioned above comprising C.I. Pigment Violet 19 or C.I. Pigment Violet 23.

Compared with the untreated pigments the pigment preparations according to the invention exhibit a distinctly improved dispersibility in the conventional application media. It was surprising and was unforeseeable that the addition of fatty acid taurides would lead to pigment preparations whose scope for application is considerably wider than that of the untreated pigments and of pigments treated with other surface-active agents. This makes it unnecessary to develop a number of pigment types of the same basic pigment for a variety of applications.

The production of quinacridone and dioxazine pigment preparations by the process according to the invention has proven particularly economic and environmentally friendly. When applied correctly the fatty acid taurides remain quantitatively on the pigment. Consequently, only very small quantities pass into the waste water. Because of their ready degradability, the small quantities are removed completely by a biological treatment of the waste water. Furthermore, only small quantities of chemicals and solvents are employed, which can be reprocessed or completely regenerated again afterwards. There are therefore no disposal problems.

The pigments and pigment preparations which are obtainable by the present invention are distinguished by their outstanding color properties and rheological properties and by their ready dispersibility and good gloss behavior when applied in a variety of media in the paints, printing and plastics sectors. The pigments and pigment preparations produced in accordance with the invention can be used for pigmenting high molecular weight organic materials of natural or synthetic origin.

Examples of high molecular weight organic materials which can be pigmented with the abovementioned pigments and pigment preparations are cellulose ethers and cellulose esters, such as ethylcellulose, nitrocellulose, cellulose acetate or cellulose butyrate, naturally occurring resins or synthetic resins such as resins produced by addition polymerization or by condensation, for example amino resins, especially urea-formaldehyde and melamine-formaldehyde resins, alkyd resins, acrylic resins, phenolic resins, polycarbonates, polyolefins such as polystyrene, polyvinyl chloride, polyethylene, polypropylene, polyacrylonitrile and polyacrylates, polyamides, polyurethanes or polyesters, rubber, casein, silicone and silicone resins, individually or as mixtures.

In this context it is irrelevant whether the abovementioned high molecular weight organic compounds are present as plastic masses or melts or in the form of spinning solutions, lacquers, coating materials or printing inks. Depending on the intended use it proves advantageous to use the pigments which have been obtained in accordance with the invention as toners or in the form of preparations or dispersions. Relative to the high molecular weight organic material to be pigmented, the pigments or pigment preparations according to the invention are employed in a quantity of preferably from 0.1 to 10%.

The pigments and pigment preparations according to the invention are particularly suitable for use in conventional lacquer systems from the class of the alkyd melamine resin lacquers and two-component lacquers based on polyisocyanate-crosslinkable alkyd resins and acrylic resins, as well as in new aqueous lacquers and in low-solvent high-solids lacquers (having a high solids content).

The pigments and pigment preparations produced in accordance with the invention are readily and very finely dispersible in many application media. They can be used to produce coatings and prints of high color strength, high gloss and high transparency in combination with excellent fastness properties.

In order to evaluate the properties in the paints sector of the pigments and pigment preparations produced according to the invention, the following was selected from the large number of known lacquer systems: an alkyd-melamine resin lacquer (AM) containing aromatic components and based on a medium-oil non-drying alkyd resin consisting of synthetic fatty acids and phthalic anhydride and on a melamine resin etherified with butanol and proportions of a non-drying alkyd resin based on ricinoleic acid (short-oil), a high-solids acrylic resin stoving enamel based on a non-aqueous dispersion (HSS), a two-component lacquer based on acrylic resin (ICA), a medium-oil alkyd resin lacquer without melamine (MA4) and an aqueous lacquer based on polyurethane (PUR).

In order to evaluate the properties in the plastics sector of the pigment preparations produced according to the invention, plasticized polyvinyl chloride (PVC) was selected from the large number of known plastics.

In order to evaluate the properties in the printing sector of the pigment preparations produced according to the invention, from among the large number of known printing systems an intaglio printing system based on nitrocellulose (NC print) and an offset printing system based on alkyd resin were selected.

The color strength and the color were determined in accordance with DIN 55986. The rheology of the milled material after the dispersion (mill base rheology) was evaluated using the following five-step scale:

| | |
|---|---|
| 5 | highly fluid |
| 4 | fluid |
| 3 | viscous |
| 2 | slightly set |
| 1 | set |

Following dilution of the milled material to the final pigment concentration, the viscosity was evaluated by means of the Rossmann "Viscospatula", Type 301, from Erichsen.

Gloss measurements were carried out on castings of the coating materials on to sheets, at an angle of 20° in accordance with DIN 67530 (ASTM D 523) using the "multigloss" glossimeter from Byk-Mallinckrodt, Wesel.

In the examples below, parts and percentages are in each case by weight.

EXAMPLE 1

900 parts of 85% strength isobutanol are placed in a stirred vessel and 30 parts of 98% strength formic acid are added. 4.5 parts of the sodium salt of a fatty acid tauride mixture (content of active substance 50%, the remainder comprising synthesis salt: predominantly sodium sulfate) of the formula (I) are added to this mixture and dissolved. In this formula (I) $R^1$ is an alkyl radical of a naturally occurring mixture of fatty acids having from 11 to 13 carbon atoms, $R^2$ is a hydrogen atom and $M^+$ is a sodium ion. Then 600 parts are added of a prepigment of C.I. Pigment Violet 23 prepared in accordance with U.S. Pat. No. 4,253,839 Example 2, containing 25% of synthesis salt, predominantly sodium chloride, and the mixture is stirred at from 20° to 25° C. for 20 hours. During this period an additional 600 parts of 85% strength isobutanol are added. Subsequently 3600 parts of water are added, the mixture is heated at boiling for 5 hours and the isobutanol is removed by azeotropic distillation by heating to 100° C. at the bridge. After cooling to 60° C., the pigment is filtered off with suction, washed with water until neutral and free of salt, and dried at 80° C.

438.7 parts of pigment are obtained which gives transparent coatings of high color strength in the AM lacquer.

The rheology is assessed as from 3 to 4. The viscosity is 7.0 s and the gloss measurement results in a value of 74. Transparent coatings of high color strength are obtained in the ICA lacquer. The viscosity is 15.6 s and the gloss measurement results in a value of 85. In the MA4 lacquer transparent coatings of high color strength are obtained. The viscosity is 40.6 s and the gloss measurement results in a value of 81. In the NC print transparent prints of high color strength and high gloss are obtained. In offset printing, prints of high transparency and high color strength are obtained. The flow properties of the printing ink are very good and its viscosity is low. Transparent colorations of high color strength are obtained in PVC. The dispersibility and fastness to bleeding are good.

EXAMPLE 2

150 parts of 85% strength isobutanol are placed in a stirred vessel and 5 parts of 98% strength formic acid are added. 3.75 parts of the sodium salt of a fatty acid tauride mixture (content of active substance 50%, the remainder comprising synthesis salt: predominantly sodium sulfate) of the formula (I) are added to this mixture and dissolved. In this formula (I) $R^1$ is an alkyl radical of a naturally occurring mixture of fatty acids having from 11 to 13 carbon atoms, $R^2$ is a hydrogen atom and $M^+$ is a sodium ion. Then 100 parts are added of a prepigment of C.I. Pigment Violet 23 prepared in accordance with U.S. Pat. No. 4,253,839, Example 2, containing 25% of synthesis salt, predominantly sodium chloride, and the mixture is stirred at from 20° to 25° C. for 20 hours. During this period a further 100 parts of 85% strength isobutanol are added. Subsequently, 600 parts of water are added, the mixture is heated at boiling for 5 hours and the isobutanol is removed by azeotropic distillation by heating to 100° C. at the bridge. After cooling to 60° C. the pigment is filtered off with suction, washed with water until neutral and free of salt, and dried at 80° C.

74.1 parts of pigment are obtained which gives transparent coatings of high color strength in the PUR lacquer. The rheology is assessed as 5. If a pigment analogous to that of Example 2 is prepared without the addition of the fatty acid tauride, however, the coating produced with this pigment has a markedly lower color strength.

EXAMPLE 3

375 parts of 85% strength isobutanol are placed in a stirred vessel and 12.5 parts of 98% strength formic acid are added. 1.9 parts of the sodium salt of a fatty acid tauride mixture (content of active substance 50%, remainder comprising synthesis salt: predominantly sodium sulfate) of the formula (I) are added to this mixture and dissolved. In this formula (I) $R^1$ is an alkyl radical of a naturally occurring mixture of fatty acids having from 11 to 13 carbon atoms, $R^2$ is a hydrogen atom and $M^+$ is a sodium ion. Then 250 parts are added of a prepigment of C.I. Pigment Violet 23 prepared in accordance with U.S. Pat. No. 4,253,839, Example 2, containing 25% of synthesis salt, predominantly sodium chloride, and the mixture is stirred at from 20° to 25° C. for 20 hours. During this period an additional 250 parts of 85% strength isobutanol are added. Subsequently 1500 parts of water are added and the mixture is heated under pressure at 110° C. for 5 hours. After cooling to 90° C. the isobutanol is removed by azeotropic distillation up to 100° C. at the bridge. The mixture is cooled to 60° C., the pigment is filtered off with suction, washed with water until neutral and free of salt, and dried at 80° C.

177.3 parts of pigment are obtained which gives transparent coatings of high color strength in the AM lacquer. Transparent prints of high color strength and high gloss are obtained in the NC print. In offset printing, prints of high transparency and high color strength are obtained. The flow properties of the printing ink are very good and its viscosity is low.

EXAMPLE 4

150 parts of 85% strength isobutanol are placed in a stirred vessel and 5 parts of 98% strength formic acid are added. 1.9 parts of the sodium salt of a fatty acid tauride mixture (content of active substance 50%, remainder comprising synthesis salt: predominantly sodium sulfate) of the formula (I) are added to this mixture and dissolved. In this formula (I) $R^1$ is an alkyl radical of a naturally occurring mixture of fatty acids having from 11 to 13 carbon atoms, $R^2$ is a hydrogen atom and $M^+$ is a sodium ion. Then 100 parts are added of a prepigment of C.I. Pigment Violet 23 prepared in accordance with U.S. Pat. No. 4,253,839, Example 2, containing 25% of synthesis salt, predominantly sodium chloride, and the mixture is stirred at from 20° to 25° C. for 20 hours. During this period an additional 100 parts of 85% strength isobutanol are added. Subsequently 600 parts of water are added and the mixture is heated under pressure at 125° C. for 5 hours. After cooling to 90° C. the isobutanol is removed by azeotropic distillation up to 100° C. at the bridge. The mixture is cooled to 60° C., the pigment is filtered off With suction, washed with water until neutral and free of salt, and dried at 80° C.

74.3 parts of pigment are obtained which gives transparent coatings of high color strength in the AM lacquer. Transparent prints of high color strength and high gloss are obtained in the NC print.

EXAMPLE 5

100 parts of 85% strength isobutanol are placed in a stirred vessel and 2.5 parts of the sodium salt of a fatty acid tauride mixture (content of active substance 50%, remainder comprising synthesis salt: predominantly sodium sulfate) of the formula (I) are added and dissolved. In this formula (I) $R^1$ is an alkyl radical of a naturally occurring mixture of fatty acids having from 11 to 13 carbon atoms, $R^2$ is a hydrogen atom and $M^+$ is a sodium ion. Then 50 parts are added of a desalinated prepigment of C.I. Pigment Violet 23 prepared in accordance with U.S. Pat. No. 4,253,839, Example 2, and the mixture is stirred at from 20° to 25° C. for 20 hours. During this period an additional 65 parts of 85% strength isobutanol are added. Subsequently a solution of 400 parts of water and 0.4 part of calcium chloride is added, and the mixture is heated at boiling for 5 hours, and the isobutanol is removed by azeotropic distillation by heating to 100° C. at the bridge. After cooling to 60° C., the pigment is filtered off with suction, washed with water until free of salt, and dried at 80° C.

48.5 parts of pigment are obtained which gives transparent colorations of high color strength in PVC.

EXAMPLE 6

90 parts of 85% strength isobutanol are placed in a stirred vessel and 3 parts of 98% strength formic acid are added. Then 60 parts are added of a prepigment of C.I. Pigment Violet 23 prepared in accordance with U.S. Pat. No. 4,253, 839, Example 2, containing 25% of synthesis salt, predominantly sodium chloride, and the mixture is stirred at from 20° to 25° C. for 20 hours. During this period an additional 60 parts of 85% strength isobutanol are added. Subsequently 360 parts of water are added, the mixture is heated at boiling for 5 hours, and the isobutanol is removed by azeotropic distillation by heating to 100° C. at the bridge. After cooling to 60° C., a solution of 22 parts of water and 1.12 parts of the sodium salt of a fatty acid tauride mixture (content of active substance 50%, remainder comprising synthesis salt: predominantly sodium sulfate) of the formula (I) is added. In this formula (I) $R^1$ is an alkyl radical of a naturally occurring mixture of fatty acids having from 11 to 13 carbon atoms, $R^2$ is a hydrogen atom and $M^+$ is a sodium ion. The mixture is stirred at 60° C. for 1 hour. Then the pigment is filtered off with suction, washed with water until neutral and free of salt, and dried at 80° C.

44.1 parts of pigment are obtained which gives transparent coatings of high color strength in the AM lacquer.

EXAMPLE 7

400 parts of 78% strength sulfuric acid are placed in a stirred vessel and 40 parts of the crude pigment of C.I. Pigment Violet 23 are added. The mixture is heated to 50° C. and is stirred at this temperature for 5 hours. The suspension is then added to 6000 parts of water and the solid product is filtered off with suction and washed until neutral. The filter residue is introduced into 600 parts of water and adjusted to pH 7 by addition of 5% strength sodium hydroxide solution, and the solid product is filtered off with suction and washed with water until neutral. The filter residue is suspended in a solution comprising 480 parts of water, one part of 98% strength formic acid and one part of the sodium salt of a fatty acid tauride mixture (content of active substance 50%, remainder comprising synthesis salt predominantly sodium sulfate) of the formula (I). In this formula (I) $R^1$ is an alkyl radical of a naturally occurring mixture of fatty acids having from 11 to 13 carbon atoms, $R^2$ is a hydrogen atom and $M^+$ is a sodium ion. Then 120 parts of 100% strength isobutanol are added. The mixture is heated at boiling and with stirring for 5 hours, and then the isobutanol is removed by azeotropic distillation by heating to 100° C. at the bridge. After cooling to 60° C., the pigment is filtered off with suction, washed with water until neutral and free of salt, and dried at 80° C.

39.9 parts of pigment are obtained which gives coatings of high color strength in the AM lacquer.

EXAMPLE 8

A suspension consisting of 85.5 parts of water, 3.6 parts of 100% strength isobutanol, 0.9 part of sodium hydroxide and 13.6 parts of the crude pigment of C.I. Pigment Violet 23 (comprising 74% of actual pigment with 26% of salt from the synthesis) is metered into a Drais PML bead mill (manufactured by Draiswerke GmbH, Mannheim) filled with 336 parts of zirconium mixed-oxide beads of diameter 0.3–0.4 mm as grinding elements, and the charge is milled for 30 minutes at 25° C. and at a peripheral stirrer speed of 15.6 m/s and a specific power density of 3.1 kW per liter of milling space. The mill base suspension is then screened to remove the grinding elements, which are rinsed with 42 parts of water, and then the mill base suspensions are combined and the isobutanol is removed by azeotropic distillation by heating to 100° C. at the bridge. Then 0.25 part of the sodium salt of a fatty acid tauride mixture (content of active substance 50%, remainder comprising synthesis salt: predominantly sodium sulfate) of the formula (I) is added. In this formula (I) $R^1$ is an alkyl radical of a naturally occurring mixture of fatty acid having from 11 to 13 carbon atoms, $R^2$ is a hydrogen atom and $M^+$ is a sodium ion. The mixture is stirred at 95° C. for 1 hour, cooled to 70° C. and adjusted to a pH of 3–4 by addition of 3.6 parts of formic acid. After cooling to 60° C., the pigment preparation is filtered off with suction, washed with water until neutral and free of salt, and dried at 80° C.

10.1 parts of pigment are obtained which gives coatings of high color strength in the HSS lacquer.

EXAMPLE 9

A suspension consisting of 40 parts of water, 0.4 part of sodium hydroxide and 13.6 parts of the crude pigment of C.I. Pigment Violet 23 (comprising 74% of actual pigment with 26% of salt from the synthesis) is metered at a rate of 1200 parts per hour into a bead mill of the type described in U.S. Pat. No. 5,062,577, which is filled with 35.5 parts of zirconium mixed-oxide beads of diameter 0.3–0.4 mm as grinding elements, and the charge is milled in circulation at from 50° to 55° C. for 1 hour at a peripheral stirrer speed of 15.6 m/s and a specific power density of 3.1 kW per liter of milling space, and then the mill base suspension is separated off. It is adjusted to a pH of 3–4 by addition of 3.6 parts of 98% strength formic acid. Then 30 parts of isobutanol and 0.25 part of the sodium salt of a fatty acid tauride mixture (content of active substance 50%, remainder comprising synthesis salt: predominantly sodium sulfate) of the formula (I) are added. In this formula (I) $R^1$ is an alkyl radical of a naturally occurring mixture of fatty acids having from 11 to 13 carbon atoms, $R^2$ is a hydrogen atom and $M^+$ is a sodium ion. The mixture is stirred at boiling temperature for 5 hours and then the isobutanol is removed by azeotropic distillation by heating to 100° C. at the bridge. After cooling to 60° C. a suspension of 25 parts of water and 0.5 part of pigment dispersing agent of the formula (II) in the form of a 30.0% water-moist press-cake is added. In this formula (II) P denotes the molecular structure of C.I. Pigment Violet 23 and X is the group (III) in which A is the imidazolyl radical, $R^3$ is a methyl group, $R^4$ and $R^5$ are each a hydrogen atom and m is 1 (this pigment dispersing agent also contains about 50% of unsubstituted C.I. Pigment Violet 23). The batch is stirred at 60° C. for 1 hour. The pigment preparation is then filtered off with suction, washed with water until neutral and free of salt, and dried at 80° C.

10.1 parts are obtained of a pigment formulation which gives NC prints of high gloss and color strength. The viscosity, and the amount of solvent consumed in the formulation of the printable ink, are very low.

EXAMPLE 10

30 parts of the crude pigment of C.I. Pigment Violet 23 (comprising 74% of actual pigment with 26% of salt from the synthesis) and 1.11 parts of the sodium salt of a fatty acid tauride mixture (content of active substance 50%, remainder comprising synthesis salt: predominantly sodium sulfate) of the formula (I) are introduced in succession into a plastic container filled to 90% of its volume with 1400 parts of cylindrical grinding elements (Cylpebs®, diameter 12 mm, manufactured by Groh GmbH, Hof). In this formula (I) $R^1$ is an alkyl radical of a naturally occurring mixture of fatty acids having from 11 to 13 carbon atoms, $R^2$ is a hydrogen atom and $M^+$ is a sodium ion. The mixture is milled for 4 hours with agitation on a vibratory mill (of the Vibratom type manufactured by Siebtechnik Mühlheim) to give a fine mill base which is then separated from the grinding elements by screening. 27.3 parts of mill base are obtained.

37.5 parts of 85% strength isobutanol are placed in a stirred vessel and 1.25 parts of 98% strength formic acid are added. 25 parts of the above mill base are then introduced, and the mixture is stirred at 20°–25° C. for 20 hours. During this period an additional 50 parts of 85% strength isobutanol are added. Subsequently 150 parts of water are added, the mixture is heated at boiling for 5 hours, and the isobutanol is removed by azeotropic distillation by heating to 100° C. at the bridge. After cooling to 60° C. the pigment is filtered off with suction, washed with water until neutral and free of salt, and dried at 80° C.

17.8 parts of pigment are obtained which gives transparent coatings of high color strength in the AM lacquer.

EXAMPLE 11

500 parts of water are placed in a stirred vessel and 40 parts of pigment (C.I. Pigment Violet 19, β phase) prepared in accordance with GB-A-951 451 are introduced in the form of the moist filter cake and suspended. The suspension is then heated to 50° C. and, at this temperature, a solution of 9 parts of water and 1 part of the sodium salt of a fatty acid tauride (content of active substance 50%, remainder comprising synthesis salt: predominantly sodium sulfate) of the formula (I) is added. In this formula (I) $R^1$ is an alkyl radical of a naturally occurring mixture of fatty acids having from 11 to 13 carbon atoms, $R^2$ is a hydrogen atom and $M^+$ is a sodium ion. The mixture is stirred at 50° C. for 2 hours, then adjusted to a pH of 1 by addition of 1% strength hydrochloric acid and stirred for 1 hour, and the solid product is filtered off with suction, washed with water until neutral and free of salt, and dried at 80° C.

39.8 parts of pigment are obtained which gives transparent coatings of high color strength in the AM lacquer.

EXAMPLE 12

A suspension of 225 parts of water, 225 parts of ethanol, 2.25 parts of sodium hydroxide and 40 parts of pigment (C.I. Pigment Violet 19, β phase) prepared in accordance with the information in GB-A-951 451, is placed in a stirred vessel. 0.5 part of the sodium salt of a fatty acid tauride (content of active substance 50%, remainder comprising synthesis salt: predominantly sodium sulfate) of the general formula (I) in which $R^1$ is an alkyl radical of a naturally occurring mixture of fatty acids having from 11 to13 carbon atoms, $R^2$ is a hydrogen atom and $M^+$ is a sodium ion, and 2 parts of pigment dispersing agent of the formula (II) in which P is the quinacridone radical, X is the group (IV) in which $R^6$ is a hydrogen atom and $R^7$ and $R^8$ are each a methyl group and p is 3 and o is 2, are added in succession to this suspension. Then 500 parts of water are added and the ethanol is distilled off to 100° C. at the bridge. Subsequently the pH of the mixture is adjusted to 1 by addition of 1% strength sulfuric acid and the mixture is stirred for an additional hour, and the solid product is filtered off with suction, washed with water until neutral and free of salt, and dried at 80° C.

41.5 parts of a pigment formulation are obtained which gives transparent coatings of high color strength in the AM lacquer. The rheology is assessed as 5 and the gloss is 81.

EXAMPLE 13

500 parts of water are placed in a stirred vessel and 40 parts of the pigment C.I. Pigment Violet 19, γ phase, prepared in accordance with GB-A-1 002 641 are added in the form of the moist filter cake and suspended. The suspension is then heated to 50° C. and, at this temperature, a solution of 9 parts of water and 0.8 part of the sodium salt of a fatty acid tauride (content of active substance 50%, remainder comprising synthesis salt: predominantly sodium sulfate) of the formula (I) is added. In this formula (I) $R^1$ is an alkyl radical of a naturally occurring mixture of fatty acids having from 11 to 13 carbon atoms, $R^2$ is a hydrogen atom and $M^+$ is a sodium ion. The mixture is stirred at 50° C. for 2 hours, then adjusted to a pH of 1 by addition of 1% strength hydrochloric acid and stirred for 1 hour, and the solid product is filtered off with suction, washed with water until neutral and free of salt, and dried at 80° C.

41.0 parts of pigment are obtained which gives transparent coatings of high color strength in the AM lacquer.

EXAMPLE 14

500 parts of water are placed in a stirred vessel and 40 parts of pigment-of 2,9-dimethylquinacridone prepared in accordance with U.S. Pat. No. 3,256,285, are introduced in the form of a moist filter cake and suspended. The suspension is then stirred to 50° C. and, at this temperature, a solution of 9 parts of water and 0.4 part of the sodium salt of a fatty acid tauride (content of active substance 50%, remainder comprising synthesis salt: predominantly sodium sulfate) of the formula (I) is added. In this formula (I) $R^1$ is an alkyl radical of a naturally occurring mixture of fatty acids having from 11 to 13 carbon atoms, $R^2$ is a hydrogen atom and $M^+$ is a sodium ion. The mixture is stirred at 50° C. for 2 hours, then adjusted to a pH of 1 by addition of 1% strength hydrochloric acid and stirred for 1 hour, and the solid product is filtered off with suction, washed with water until neutral and free of salt, and dried at 80° C.

38.3 parts of pigment are obtained which gives transparent coatings of high color strength in the AM lacquer.

EXAMPLE 15

500 parts of water are placed in a stirred vessel and 40 parts of pigment of 1,8-dichloroquinacridone prepared in accordance with U.S. Pat. No. 3,256,285, are introduced in the form of a moist filter cake and suspended. The suspension is then heated to 50° C. and, at this temperature, a solution of 9 parts of water and 1 part of the sodium salt of a fatty acid tauride (content of active substance 50%, remainder comprising synthesis salt: predominantly sodium sulfate) of the formula (I) is added. In this formula (I) $R^1$ is an alkyl radical of a naturally occurring mixture of fatty acids having from 11 to 13 carbon atoms, $R^2$ is a hydrogen atom and $M^+$ is a sodium ion. The mixture is stirred at 50° C. for 2 hours, then adjusted to a pH of 1 by addition of 1% strength hydrochloric acid and stirred for 1 hour, and the solid product is filtered off with suction, washed with water until neutral and free of salt, and dried at 80° C.

38.9 parts of pigment are obtained which gives transparent coatings of high color strength in the AM lacquer.

We claim:

1. A pigment preparation consisting essentially of
    a) a pigment from the class of the quinacridones or dioxazines,
    b) one or more of the fatty acid taurides of the formula (I)

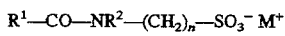

$$R^1—CO—NR^2—(CH_2)_n—SO_3^- M^+ \quad (I)$$

in which
    $R^1$ is a straight-chain or branched alkyl group having from 10 to 24 carbon atoms and
    $R^2$ is a hydrogen atom or a $C_1–C_6$-alkyl group,
    $M^+$ is a hydrogen ion, alkali metal ion or alkaline earth metal ion and n is 1 or 2, and c) optionally a pigment dispersing agent of the formula (II)

$$P-[X]_m \quad (II)$$

in which
    P is an m-valent radical of a pigment based on a quinacridone or dioxazine,
    m is from 1 to 4 and
    X is a group of the formula (III)

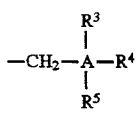

in which A is a five- or six membered aromatic heterocycle which optionally is fused and which contains from 1 to 3 identical or different heteroatoms selected from the group consisting of nitrogen, oxygen and sulfur, and the heterocycle is attached to the methylene group via a carbon atom, $R^3$ and $R^4$ are a hydrogen atom, a $C_1–C_4$-alkyl, $C_2–C_4$-alkenyl or aryl group, and $R^3$ and $R^4$ optionally together form an aliphatic or aromatic ring, and $R^5$ is a hydrogen atom or a $C_1–C_4$-alkyl, $C_1–C_3$-hydroxyalkyl or $C_2–C_4$-alkenyl group, or in which X is a group of the formula (IV)

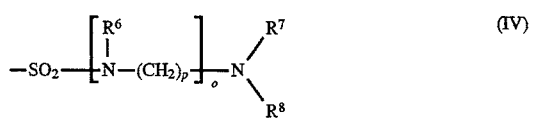

in which $R^7$ and $R^8$ independently of one another are each a hydrogen atom or a $C_1–C_{20}$-alkyl, $C_2–C_{20}$-alkenyl or $C_5–C_7$-cycloalkyl group, or in which $R^7$ and $R^8$ together with the adjacent nitrogen atom are an aliphatic or aromatic five- or six-membered heterocyclic system containing as ring members in each case from 1 to 3 identical or different heteroatoms selected from the group consisting of nitrogen, oxygen and sulfur, and $R^6$ is a hydrogen atom or a $C_1–C_4$-alkyl group, p is 1 to 6 and o is 1 or 2.

2. A pigment preparation as claimed in claim 1, consisting essentially of
    a) from 99.9 to 90% by weight of a pigment from the class of the quinacridones or dioxazines,
    b) from 0.1 to 10% by weight of one or more fatty acid taurides of the formula (I), and
    c) from 0 to 9.9% by weight of a pigment dispersing agent of the formula (II).

3. A pigment preparation as claimed in claim 1, consisting essentially of
    a) from 99.5 to 90% by weight of a pigment from the class of the quinacridones or dioxazines,
    b) from 0.5 to 5% by weight of one or more fatty acid taurides of the formula (I), and
    c) from 0.5 to 5% by weight of a pigment dispersing agent of the formula (II).

4. A pigment preparation as claimed in claim 1, wherein the pigment is C.I. Pigment Violet 19.

5. A pigment preparation as claimed in claim 1, wherein the pigment is C.I. Pigment Violet 23.

6. A pigment preparation as claimed in claim 1, wherein $R^1$ is an alkyl radical having from 11 to 13 carbon atoms.

7. A pigment preparation as claimed in claim 1, wherein A is imidazolyl or indolyl.

8. A pigment preparation as claimed in claim 1, wherein $R^7$ and $R^8$ together with the adjacent nitrogen atom form a morpholinyl or pyrrolidinyl ring system.

9. A process for the production of a pigment preparation as claimed in claim 1, which comprises adding component b) in a quantity of from 0.1 to 10% by weight, based on dry pigment, before, during or after the finishing operation.

10. A process for the production of a pigment preparation as claimed in claim 1, which comprises adding component b) in a quantity of from 0.5 to 5% by weight, based on dry pigment, before, during or after the finishing operation.

11. The process as claimed in claim 10, which comprises adding component b) directly prior to the finishing operation.

12. The process as claimed in claim 9, which comprises adding the pigment dispersing agent of the formula (II) during the fine division, before, during or after the finishing operation or to the isolated, moist pigment.

13. A method of pigmenting lacquers, printing inks or plastics comprising the step of incorporating a pigment preparation as claimed in claim 1, as colorant into said lacquers, printing inks or plastics.

* * * * *